US008443404B2

(12) United States Patent
Chetlur et al.

(10) Patent No.: US 8,443,404 B2
(45) Date of Patent: May 14, 2013

(54) SESSION LIFE-CYCLE QUALITY-OF-EXPERIENCE ORCHESTRATION FOR VOD FLOWS IN WIRELESS BROADBAND NETWORKS

(75) Inventors: Malolan Chetlur, Domlur (IN); Umamaheswari C. Devi, Domlur (IN); Shivkumar Kalyanaraman, Bangalore (IN); Sumedh W. Sathaye, Research Triangle Park, NC (US); John Michael Tracey, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/772,560

(22) Filed: May 3, 2010

(65) Prior Publication Data

US 2011/0271309 A1   Nov. 3, 2011

(51) Int. Cl.
*G01R 31/08* (2006.01)
*G06F 11/00* (2006.01)
*G08C 15/00* (2006.01)
*H04N 7/16* (2011.01)
*H04N 7/173* (2011.01)
*H04J 1/16* (2006.01)
*H04J 3/14* (2006.01)
*H04L 1/00* (2006.01)
*H04L 12/26* (2006.01)
*H04W 72/00* (2009.01)

(52) U.S. Cl.
USPC ............ 725/62; 725/86; 725/91; 725/93; 725/94; 725/95; 725/96; 370/229; 370/232; 370/233; 370/234; 455/450; 455/452.1; 455/452.2

(58) Field of Classification Search ............. 725/95
See application file for complete search history.

(56) References Cited

U.S. PATENT DOCUMENTS 7,318,111 B2   1/2008   Zhao
7,349,340 B2   3/2008   Sahai et al.
(Continued)

FOREIGN PATENT DOCUMENTS

WO   WO2005041495   5/2005

OTHER PUBLICATIONS

Maarten Wijnants, et al., "Improving the User Quality of Experience by Incorporating Intelligent Proxies in the Networks," Expertise Centre for Digital Media, Limburgs Universitair Centrum, Wetenschapspark 2, B-3590-Diepenbeek, Published Apr. 2005.

(Continued)

*Primary Examiner* — Justin Shepard
(74) *Attorney, Agent, or Firm* — F. Chau & Associates, LLC; Brian P. Verminski, Esq.

(57) ABSTRACT

A network system includes a connectivity services network (CSN), a plurality of access service network gateways, a plurality of base stations, an orchestration device, executing a lifecycle quality-of-experience model for video-on-demand flows, receiving content from the CSN, and a plurality of subscriber stations in communication with the orchestration device through a base station and/or gateway, wherein the orchestration device continuously tracks past service and usage for each of the subscriber stations and predicts future channel conditions and load to determine, periodically or when triggered by critical events, many-to-one assignments from subscriber stations to base stations and allocation of base station resources to subscriber stations assigned to it.

25 Claims, 6 Drawing Sheets

U.S. PATENT DOCUMENTS

| | | | |
|---|---|---|---|
| 7,652,993 B2 * | 1/2010 | van Beek | 370/231 |
| 2002/0075806 A1 | 6/2002 | Shalvi et al. | |
| 2004/0103437 A1 * | 5/2004 | Allegrezza et al. | 725/95 |
| 2007/0271590 A1 | 11/2007 | Gulas et al. | |
| 2007/0287467 A1 * | 12/2007 | Oswal et al. | 455/452.2 |
| 2008/0098446 A1 | 4/2008 | Seckin et al. | |
| 2008/0155087 A1 | 6/2008 | Blouin et al. | |
| 2008/0183862 A1 * | 7/2008 | Kobayashi | 709/224 |

OTHER PUBLICATIONS

Abstract of "Enhancing Quality of Experience in Next Generation Networks Through Network Selection Mechanisms", Published Sep. 2007.

Abstract of "Means and Methods for Collecting and Analyzing QoE Measurements in Wireless Network", Posted online Jul. 2006.

* cited by examiner

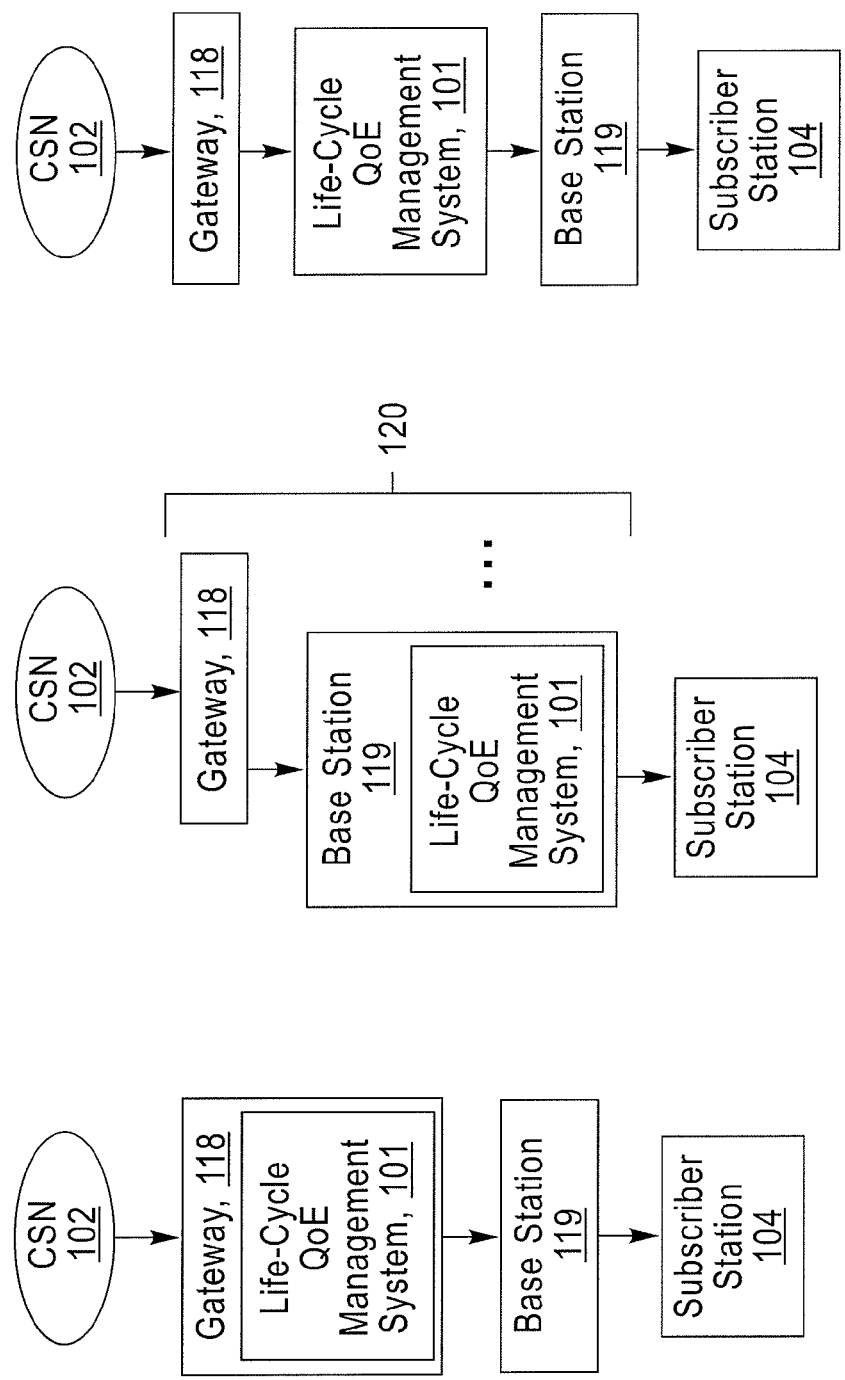

SESSION LIFE-CYCLE QUALITY-OF-EXPERIENCE ORCHESTRATION FOR VOD FLOWS IN WIRELESS BROADBAND NETWORKS

BACKGROUND

1. Technical Field

The present disclosure generally relates to quality-of-experience (QoE) in wireless networks, and more particularly to managing QoE for Video-on-Demand (VoD) sessions in 4G wireless networks.

2. Discussion of Related Art

Broadband Wireless technologies are expected to be widely deployed. They allow high bandwidth applications such as video-on-demand (VoD), video conferencing and other streaming applications delivered over a wireless link with both quality-of-service (QoS) guarantees and adherence to security specifications. The adoption of 4G networks also encourages large number of participant equipment manufacturers and service providers to contribute and lead in 4G ecosystem development.

Delivery of managed services over 4G is a potential business opportunity. Managed service ensures delivery of a end-user service while meeting end-user and organizational expectations for that service. In 4G networks, one major differentiator is the quality-of-service (QoS) support that can enhance the quality-of-experience (QoE). The challenges to be addressed in this regard in 4G wireless networks are distinct and unique compared to those in wireline or pre-4G wireless networks.

Guaranteeing QoE is difficult for applications delivered over any network and this is compounded in broadband wireless networks due to aspects of mobility, time-varying channel capacity, high-bandwidth applications, etc. Existing techniques mainly address managing the contracted QoS parameters.

In prior work in the general area of QoS in wireless and wired networks, pre-reservations with BSs in the user path has been proposed. Similarly, adapting the instantaneous rate to the current conditions and providing reduced QoS using layered encoding has been considered in the context of multimedia traffic.

These prior works propose elaborate networked systems for alleviating congestion in wired networks. Managing service in wireless networks requires orchestration methods that are cognizant of issues specific to wireless networks and therefore the methods proposed therein do not extend to wireless networks.

BRIEF SUMMARY

A network system includes an access service network hosting a plurality of access service network gateways and a plurality of base stations, with each access service network gateway connected to a subset of base stations, an orchestration device executing a life-cycle quality-of-experience model for video-on-demand flows, receiving content from at least one video-on-demand streaming server, and a plurality of subscriber stations, receiving a plurality of video-on-demand flows, in communication with the orchestration device through at least one of the base stations, wherein the orchestration device tracks past variables associated with each of the subscriber stations and predicts a future channel condition and load to determine subscriber station assignments to at least one base station and an allocation of base station resources to the subscriber stations.

A method for orchestrating a plurality of video-on-demand sessions being delivered to a plurality of subscriber stations includes determining estimates of future bit rates for all sessions being served to the subscriber stations and estimated loads at each base station serving the plurality of subscriber stations, determining session states in the absence of any intervention and a desired service level to take each session to a safe state, adjusting parameters of the video-on-demand sessions within the base station upon detecting an event, determining a time at which global base station intervention is to be performed if local base station intervention is not possible, and determining subscriber station assignments to the base stations and allocations to each of the subscriber stations during each global intervention, wherein the method is executed by a processor.

A network system includes a connectivity services network providing content to a plurality of video-on-demand streaming servers, an access service network hosting a plurality of access service network gateways and a plurality of base stations, with each access service network gateway connected to a subset of base stations, an orchestration device executing a life-cycle quality-of-experience model for video-on-demand flows, receiving the content from at least one of the video-on-demand streaming servers, and a plurality of subscriber stations, receiving video-on-demand flows, in communication with the orchestration device through at least one of the base stations, wherein the orchestration device tracks past variables associated with each of the subscriber stations and predicts a future channel condition and load to determine subscriber station assignments to at least one base station and an allocation of base station resources to the subscriber stations.

BRIEF DESCRIPTION OF THE SEVERAL VIEWS OF THE DRAWINGS

Preferred embodiments of the present disclosure will be described below in more detail, with reference to the accompanying drawings:

FIG. 1-B is a diagram of inputs to a life-cycle QoE orchestration system according to an embodiment of the present disclosure;

FIG. 1-C shows a life-cycle QoE management system according to an embodiment of the present disclosure;

DETAILED DESCRIPTION

According to exemplary embodiments of the present disclosure, a life-cycle QoE model is described for backlogged Video-on-Demand (VoD) sessions in networks that takes into account past, present, and future values of parameters that directly or indirectly influence the user experience. A system and method based on the QoE model for managing the experience of a plurality of VoD users throughout their session lifetimes in broadband wireless networks is supported by the present disclosure. The exemplary networks described herein are WiMAX networks but may include different network technologies, such as 3GPP Long-Term Evolution (LTE).

According to exemplary embodiments of the present disclosure, QoE may be improved during an entire lifetime of a mobile streaming VoD session in a wireless broadband network characterized by user mobility and varying channel conditions and load by considering the entire lifecycle. According to exemplary embodiments of the present disclosure, a method actively manages the life-cycle of a session by (i) building a life-cycle QoE model that considers past, present, and future conditions along multiple dimensions such as user mobility, channel quality, and network load, (ii) continuously updating the model parameters based on past history and set-points, and (iii) using the model to minimize encountering high-penalty states.

Figure 1A:
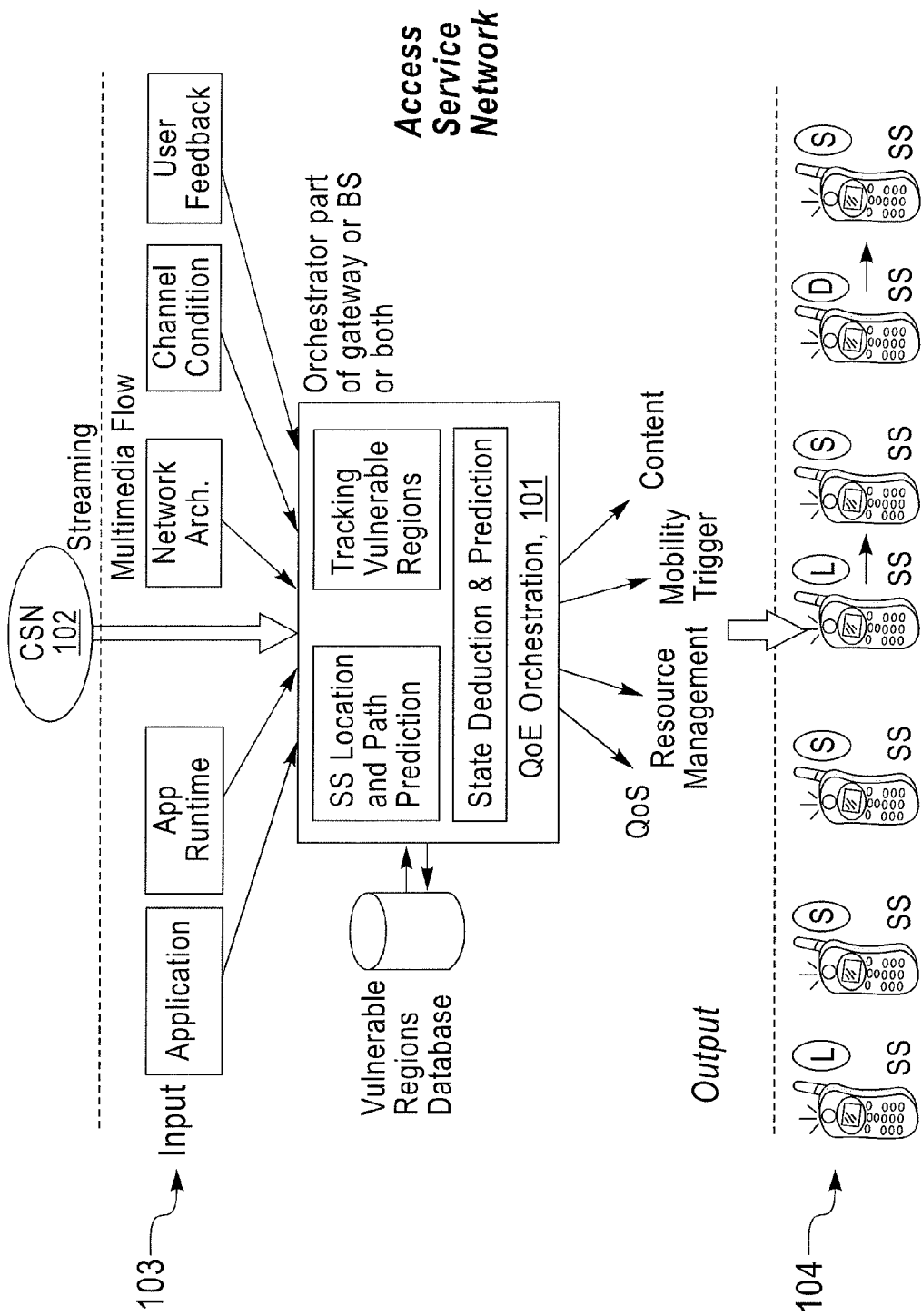
FIG. 1-A shows a QoE orchestration architecture at an access service network according to an embodiment of the present disclosure.
FIGS. 1D-F are arrangements of the QoE orchestration architecture shown in the FIG. 1-A according to exemplary embodiments of the present disclosure.
Figure 1B:
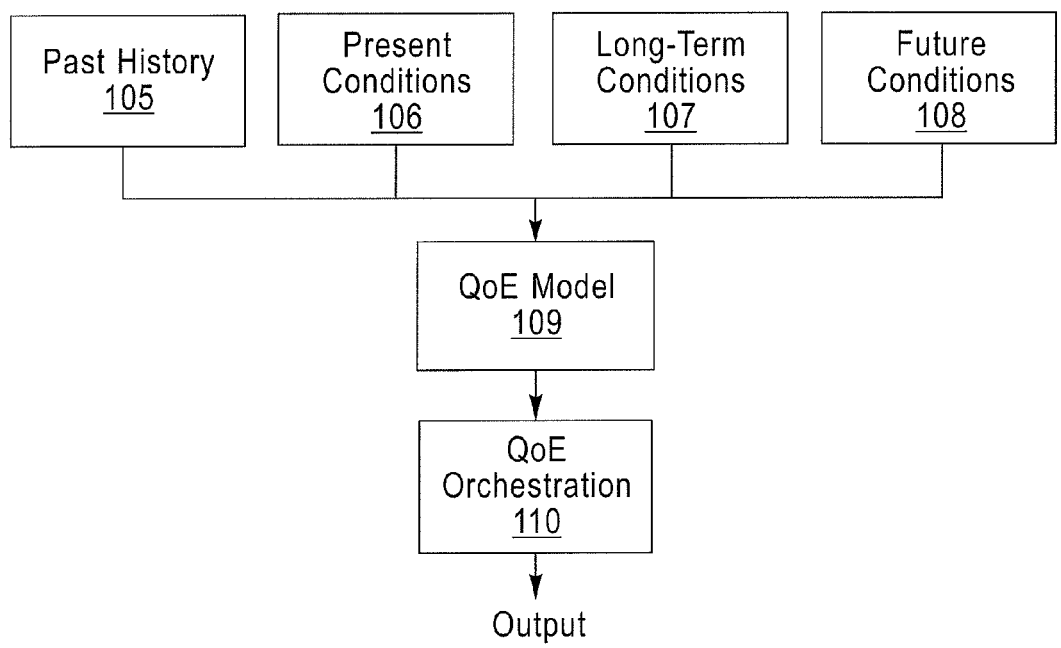
Figure 1C:
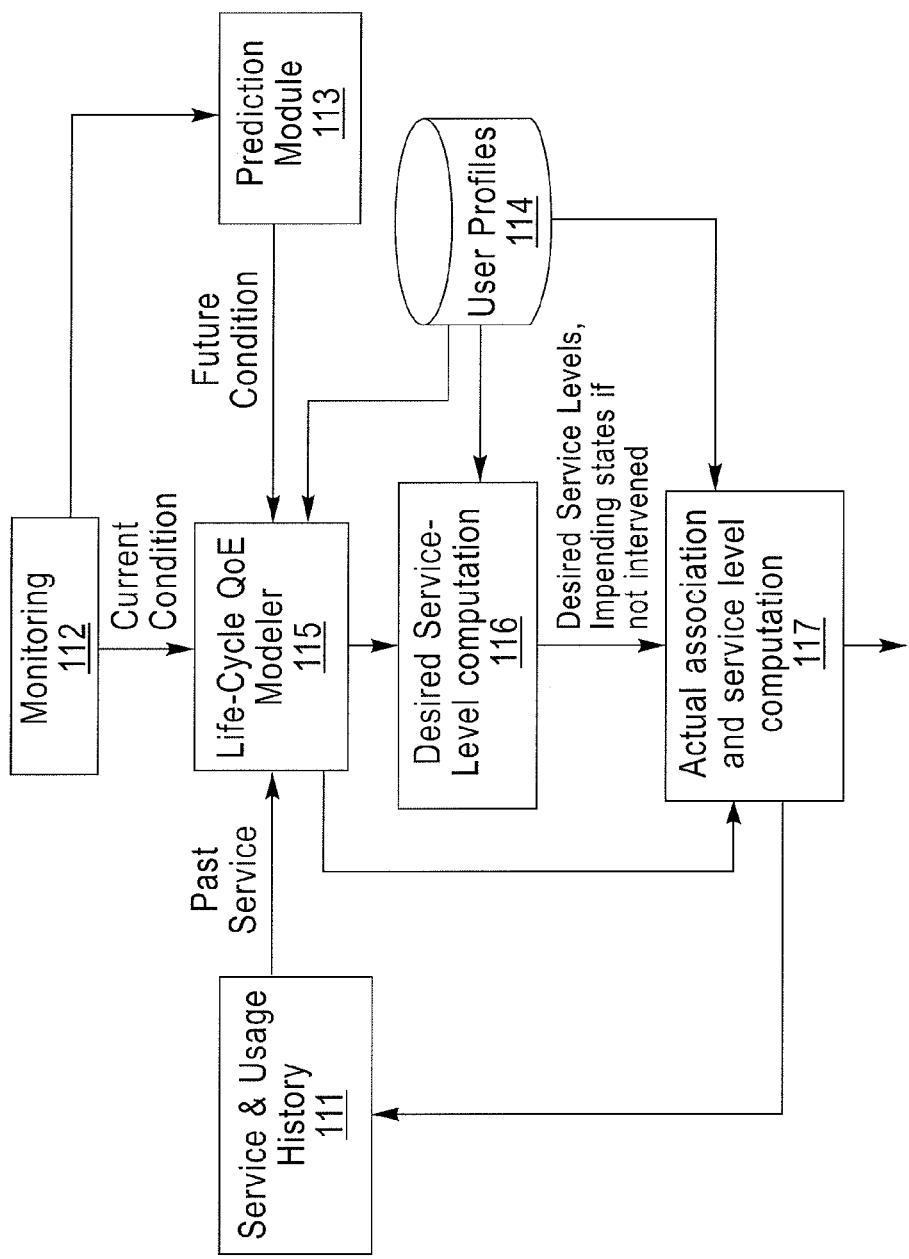

FIG. 1-A shows a view of QoE orchestration architecture at an access service network. A life-cycle QoE management system 101 receives various input, including content such as Internet access, location-based services, Internet Multimedia and Multimedia Broadcast/Multicast MBS services and voice services, hereinafter a flow, from the a connectivity-services network (CSN) 102 and state information 103 including, for example, application and application runtime information, network architecture, channel conditions, and feedback information. The life-cycle QoE management system 101 generates flow QoS triggers, resource management triggers, and mobility triggers to base stations (BSs) to reassign SSs 104 to BSs and/or BS resources to flows (serving SSs) and can optionally perform content engineering. The life-cycle QoE management system 101 can be implemented in a gateway 118 (see FIG. 1-D) or all the base stations (BS) connected to a gateway 119 (see FIG. 1-E) or both, or may be situated in between the gateway 118 and the BSs 119 the gateway is connected to (see FIG. 1-F). A BS is hardware equipment facilitating wireless communication between SSs and a network. In the case of the system shown in FIG. 1-E, the orchestration device can be thought of as having a distributed implementation, with multiple instantiations each on a different BS 119, where the different instances coordinate for managing the VoD flows. For purposes of the following description, it can be assumed that the life-cycle QoE management system 101 is situated between the gateway 118 and the BSs 119 it is connected to as shown in FIG. 1-F. In the case of the system of FIG. 1-F, the gateway 118 is connected to the life-cycle QoE management system 101 and the life-cycle QoE management system 101 to all the BSs 119.

According to an embodiment of the present disclosure, an access service network can have multiple gateways. In such a case, one orchestration device, in the form of multiple instantiations for the embodiment in FIG. 1-E, is needed for each subnetwork 120 comprising a gateway 118 and all its BSs 119.

Referring to FIG. 1-B the life-cycle QoE management system 101 (see FIG. 1-A) receives state information including past history 105, present conditions 106, long-term conditions 107, and future conditions. Within the life-cycle QoE management system 101, a life-cycle model 109 captures state information along with a flow's buffer levels and the inputs 105-107, and a QoE orchestration module 110 manages the QoS/QoE for the flow over the lifetime of the flow.

Referring to FIG. 1-C, in the life-cycle QoE management system 101, a session's life-cycle can be characterized by states including, Luxury (L), Safe (S), Danger (D), and Penalty (P). The states described herein are not intended to be limiting; other states may be implemented. A session's state can be determined based on (i) its past and current service levels and usage history 111, (ii) current and future resources 112 and 113 (e.g., radio parameters, cells, etc.), (iii) a user's predicted path 114, and (iv) network load. QoE management insures a session against contingencies predicted for the future by using its lifecycle QoE model 115 to determine needed service levels 116 (e.g., resource allocation), to manage 117 a contingency buffer of appropriate size at the subscriber station (SS), migrating to an alternative BS, etc. When in the Luxury (L) or Safe (S) states, a session's contracted service parameters may be lowered to prevent needy, co-existing sessions from encountering the danger (D) or penalty (P)) states, which are associated with relatively high-penalties.

The notation used herein can be defined as follows.

Figure 2:
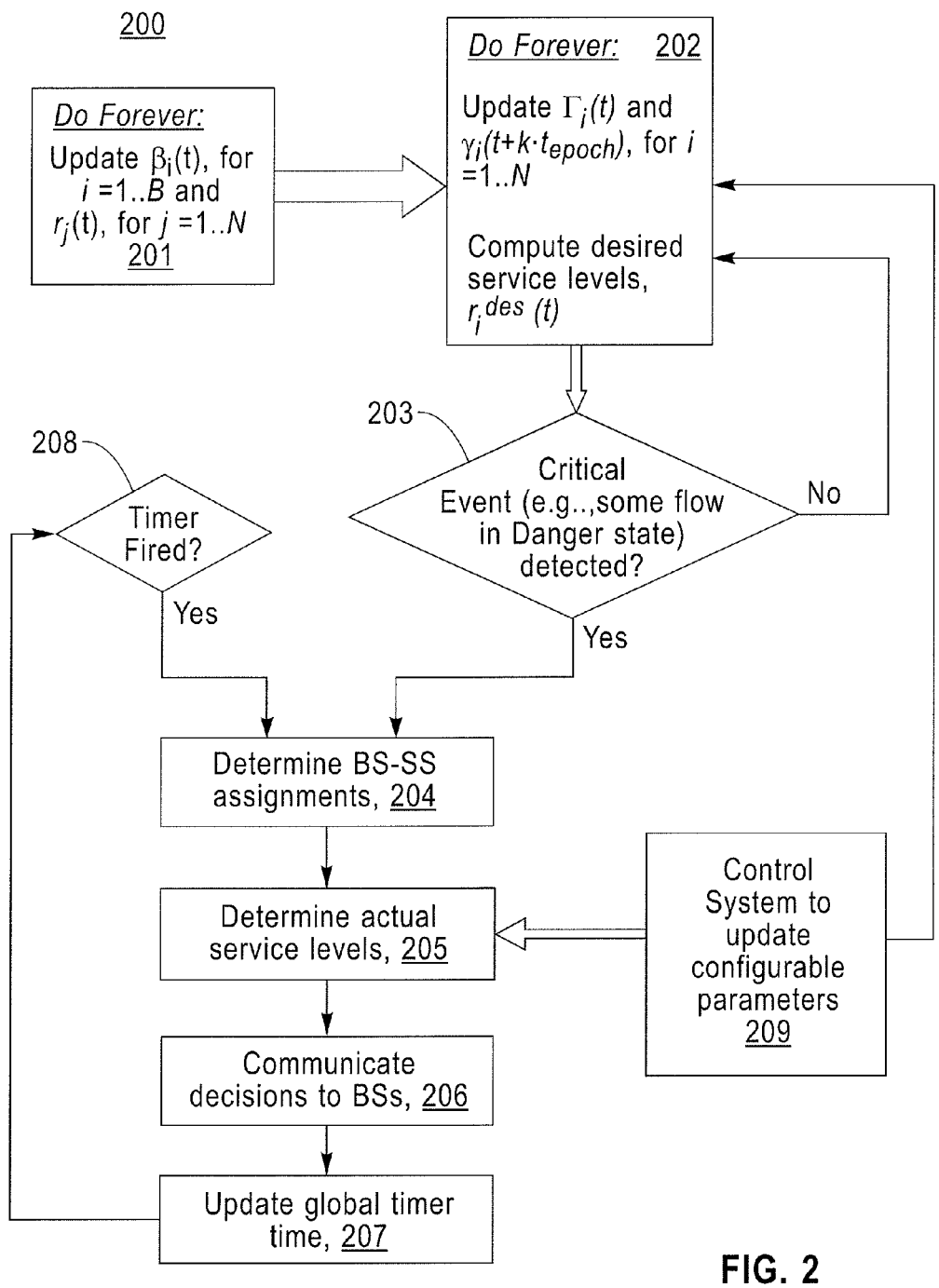
FIG. 2 QoE orchestration for VoD flows according to an embodiment of the present disclosure.

$f_i$: session or flow i, i=1 . . . N
$\alpha_i$: desired steady-state buffer level, in units of time, say seconds, for $f_i$
$\alpha^B_i$: desired steady-state target buffer level in bytes for $f_i$
$p_i(t)$: playout rate for $f_i$ at time t. For simplicity, we assume that the source is CBR, that is,
$p_i(t)=p_i$, for all t. The approach can be extended to VBR sources too.
$r_i(t)$: estimated average achievable rate for $f_i$ at time t
$\gamma_i(t)$: actual/estimated buffer level in bytes at time t
$\sigma_i(t)$: state of $f_i$ at time t
$b_i$: base station i, i=1 . . . B
$\beta_i(t)$: load at BS i at time t
$\Gamma_i(t)$: BS for flow i at time t
$r_i^{des}(t)$: desired service level for flow i at time t Referring to FIG. 2, QoE orchestration for VoD flows includes, at block 201, using a prediction module to continuously update estimates of future bit rates for all sessions and estimated loads for all BSs. At block 202, the QoE lifecycle model and inputs provided by the predictor are used to determine session states in the absence of any intervention and desired service levels to take each session to the Safe state (S). This is performed either periodically or when future estimates or current conditions change. At block 203, if a critical event such as a buffer underflow for a premium user is detected, then local BS intervention is attempted if possible by adjusting rates or schedules within the concerned BS. If local intervention is not possible then the time at which global BS intervention should be performed is updated (see block 207). When a global intervention timer fires (see block 208), BS-SS assignments (see block 204) are reevaluated, actual allocations to SSs at the assigned BSs are determined (see block 205) and these assignment/allocation decisions are communicated to the BSs (see block 206). At block 207, the next global intervention time is updated. Configurable parameters such as $\alpha_i$ (see block 205) are updated by a control system (see block 209).

Certain components and steps of the QoE orchestration process above are described in detail in the following sections.

The life-cycle QoE model (see 109, FIG. 1-B) at block 202 provides a session's state based on past, present, and future session and network conditions, estimated buffer levels (for the session at the SS) at the end of each of a certain number of epochs, say k, in the future, and expected penalty for the session for a given allocation in the current epoch.

Referring to the life-cycle QoE states; a session can be in one of Luxury (L), Safe (S), Danger (D), and Penalty (P) states during its life-cycle. These states are defined as follows.

Luxury State (L):
A session i is in luxury state at time t, if its expected buffer level is at least $c \times \alpha_i$ at the end of each of $k_i$ epochs in the future, where c>1 and $k_i$>1 are configurable parameters.

Safe State (S):
A session i is in safe state at time t, if its expected buffer level is at least $\alpha_i$ at the end of each of $k_i$ epochs in the future.

Danger (D):
A session i is in danger state at time t, if its expected buffer level can fall under $\alpha_i$ but remains above zero at the end of one or more of the $k_i$ epochs in the future.

Penalty (P):
A session i is in penalty state at time t, if its buffer is expected to underflow (go below zero) in one or more of the $k_i$ epochs in the future. The penalty state is not to be confused with the penalty assigned to a flow for service violations.

All the configurable parameters are updated continuously, either periodically or when triggered by the occurrence of critical events, using control-theoretic techniques (see block 209).

Future buffer levels for session i are estimated using the following (provided by the prediction module 113):

Predicted channel quality during future epochs, $r_i(t+m \cdot t_{epoch})$, $0 \leq m < k_i$.

Playout rate during future epochs, $p_i(t+m \cdot t_{epoch})$, determined by inspecting future sections of the stream.

Preferred base station for flow i during future epochs, $\Gamma_i(t+m \cdot t_{epoch})$ Load at the preferred base station, $\beta_i(t)$.

The prediction module 113 continuously refines its estimates of the above values.

Buffer level at the end of the kth epoch, $1 \leq k \leq k_i$, is estimated as follows:

$$\gamma_i(t+k \cdot t_{epoch}) = \max(0, \gamma_i(t+(k-1) \cdot t_{epoch}) + (r_i(t+k \cdot t_{epoch}) - p_i(t+k \cdot t_{epoch})) \times t_{epoch})$$

To estimate $r_i$; $r_i$ for each of the $k_i$ future epochs is estimated using the preferred base station, $\Gamma_i$, for flow i during that epoch, the estimated load at $\Gamma_i$, and the quality of the channel for flow i to $\Gamma_i$ in that epoch. $r_i$ at the end of the kth epoch, $1 \leq k \leq k_i$ is given by the following:

$$r_i(t+k \cdot t_{epoch}) = \frac{\text{signal\_strength}_{estimated}}{\text{signal\_strength}_{average}} \times \frac{load_{avg}}{load_{estimated}} \times p_i,$$

where the estimations are for the kth epoch, and the average signal strength is the average over the duration of the entire session at the preferred base station.

Various methods/models can be used to estimate the penalty that would be incurred if a session is not served at the rate desired. An exemplary method assigns a number that is proportional to the loss in revenue that would ensue. A refinement would be to scale the loss in proportion to the number of violations already incurred for the session. For example, if a revenue loss would be incurred only after say x seconds of stall, then the loss could be scaled in proportion to how much stall is expected in the current epoch and has already been incurred. The service and usage history module tracks the service delivered to flows, which is used by the QoE modeler 115 to determine the penalty.

At block 202, a desired (necessary/sufficient) service level in the current epoch that ensures that flow i is in safe state is determined as follows. In determining this level, service levels in the future epochs for flow i are estimated. It is possible that the desired level cannot be provided, but this is not of concern at this step.

For flow i:

$r_i^{des}(t) := 0;$
For future epochs k = 1 to $k_i$ do
　// Determine the deficit/surplus at the end of the kth epoch $$\text{deficit} = -\alpha_i^B + \gamma_i(t) - \sum_{i=1}^{k} p_i(t) \cdot t_{epoch} + \sum_{i=1}^{k} r_t(t) \cdot t_{epoch}$$

// Absorb the deficit/surplus in the first epoch in proportion to the rate achievable in the
　// epoch and the load of the BS
　If deficit > 0 Then $$\text{let } R_i(t) := \frac{\text{signal\_strength}(t) \times \text{spare}_{\Gamma_i(t)}(t)}{\sum_{i=1}^{k} \text{signal\_strength}_{\Gamma_i(t)}(t+1 \cdot t_{epoch}) \times \text{spare}_{\Gamma_i(t)}(t+1 \cdot t_{epoch})}$$

Else $$\text{let } R_i(t) := \frac{\frac{1}{\text{signal\_strength}(t) \times \text{spare}_{\Gamma_i(t)}(t)}}{\sum_{l=1}^{k} \frac{1}{\text{signal\_strength}_{\Gamma_i(t)}(t+1 \cdot t_{epoch}) \times \text{spare}_{\Gamma_i(t)}(t+1 \cdot t_{epoch})}}$$

Fi　(end If)

$$\text{rate}_{desired} := r_i(t) + \frac{\text{deficit}}{t_{epoch}} \times R_i(t)$$

$r_i^{des}(t) := \max(r_i^{des}(t), \text{rate}_{desired})$
od

At block 204, the desired service levels can be used to determine SS assignments such that hot-spots and congestions due to them are minimized.

An exemplary implementation of block 204 is provided here.

Initially assign each SS to the BS to which the SS has the strongest signal (e.g., best channel). Let $SS_b$ denote the set of all SSs assigned to BS b. Determine the load at each BS for the initial assignment using desired service levels of SSs.

While TRUE do
　For each BS b that is overloaded do
　　If there does not exist a base station b' such that load(b') < η × load(b) then break Fi
　　Let $SS'_b$ := set of all SSs to which BS b has a better channel than any other BS by a factor of at least v, where v is configurable
　　Retain all SSs in $SS'_b$ at BS b.
　　For each SS s in $SS_b \setminus SS'_b$ that is in L or S state taken in a non-decreasing order of their desired service levels do
　　　Assign s to a BS b' to which its signal strength is not worse by more than a factor v, provided load(b') after assignment is at most η × load(b).
　　　If load (b) < 1 then break fi;
　　od
　od
　If SS assignment or allocation did not change in the current iteration
　Exit
Fi
od At block 205, the desired service levels and BS-SS assignments determined are used along with session priorities and Service Level Agreements (SLAs) to determine actual service levels for sessions. Opportunistic scheduling, which favors users with good channels, can be used to improve overall network utilization, but the approach can be extremely unfair. On the other hand, allocation based solely on desired service levels can grossly underutilize the network's resources. Moreover, with high probability, meeting the service level desired by every flow in the current epoch can be infeasible. One way of alleviating the imbalance and determining an allocation when not all demands can be met is to use proportional-fair scheduling, which is known to find a balance between system throughput and user fairness. To ensure that demands are prioritized by criticality, each session is assigned a weight. The weight depends on the session's desired service level, static priority based on, for example, price paid by the subscriber for the service, and a penalty of not providing the desired service level. The penalty is based on prior violations for the service and its computation. The weight $w_i$ assigned to flow i is given by:

$$w_i = r_i^{des}(t) \cdot (1 + \rho_1 \cdot prio_i + \rho_2 \cdot penalty_i),$$

where $\rho_i = \rho_2 = 1$ to begin with and adjusted based on system throughput achieved and QoS guarantees met. Allocations to individual sessions are then determined by maximizing $$\sum_{i=1}^{N} w_i \cdot \log(r_i(t) \cdot x_i(t)),$$

subject to $x_i(t) \geq 0$ for all i, and $$\sum_{i=1}^{N} x_i(t) \leq S,$$

where $x_i(t)$ is the allocation in relevant units for session i and S is the total resources at the base station.

Existing methods can be used for predicting user mobility (e.g., random waypoints) and channel quality (e.g., Kalman filters) and BS load for the future.

A tracking service and usage history module can be used to track the actual service delivered to each flow and violations, if any, to SLAs.

Referring to the control system (see block 209 in FIG. 2), parameters of the life-cycle QoE model can be adjusted. For example, each flow can be provided with a buffer-size controller to adjust its target buffer size based on buffer usage. Thus, the system can reclaim part of the buffer, and some bandwidth, from a flow, if the flow's buffer rarely depletes, meaning that conditions are generally good for it that a smaller contingency buffer would suffice to handle emergencies. This is achieved by tracking, for each flow, at the end of each epoch, the difference between the flow's targeted buffer level and actual buffer level, and adjusting, using a PI controller, the target buffer level such that the difference is maintained at a particular set point.

Another exemplary controller is the system throughput versus QoS controller. This controller operates to balance system throughput against providing QoS guarantees to adjust the parameters $\rho_1$ and $\rho_2$ in the expression for the weight $w_i$ used in computing actual service levels. If the throughput is low while SLAs are not being violated, $\rho_1$ and $\rho_2$ will be lowered, and vice versa.

It is to be understood that embodiments of the present disclosure may be implemented in various forms of hardware, software, firmware, special purpose processors, or a combination thereof. In one embodiment, a method for managing QoE in network systems may be implemented in software as an application program tangibly embodied on a computer readable medium. As such the application program is embodied on a non-transitory tangible media. The application program may be uploaded to, and executed by, a processor comprising any suitable architecture.

Figure 3:
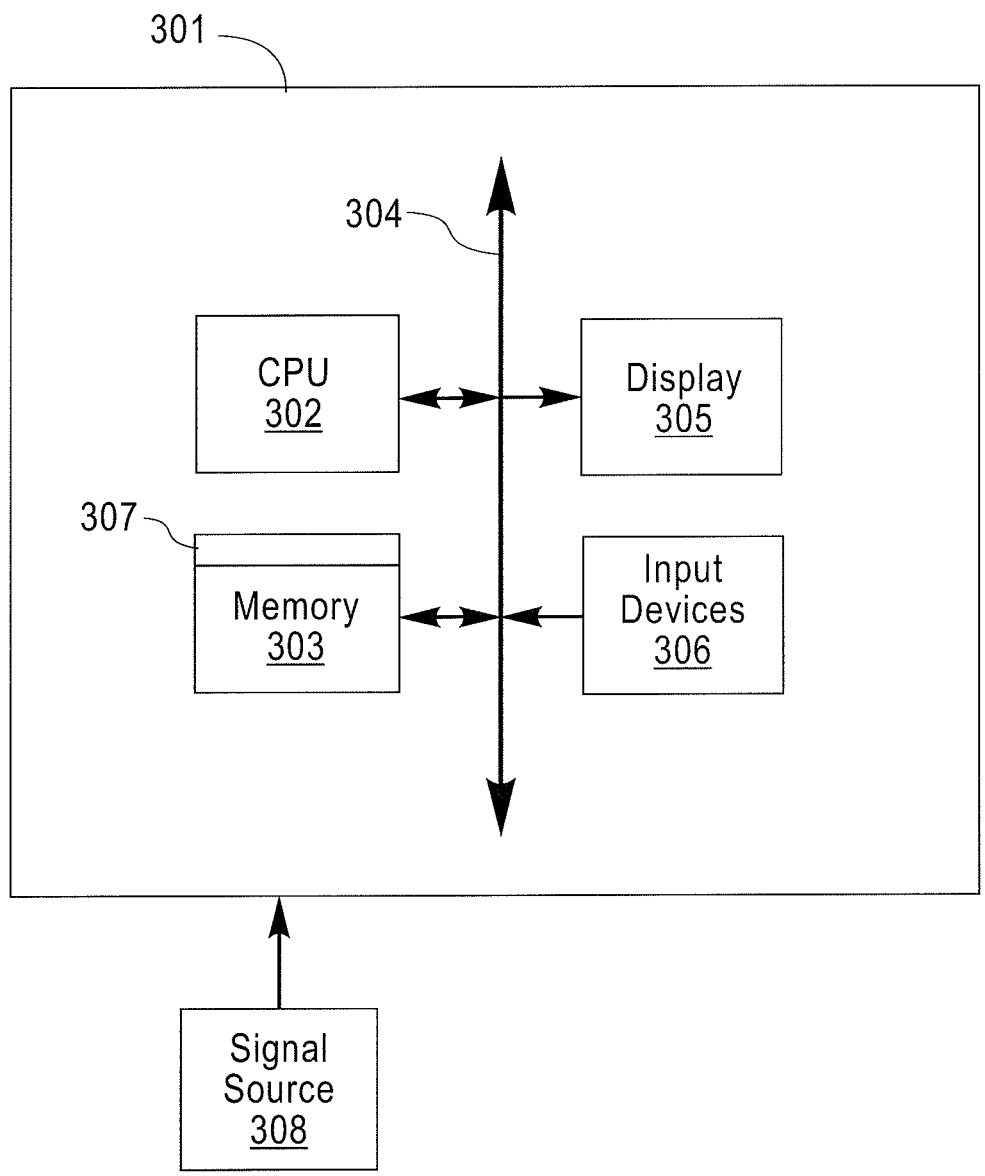
FIG. 3 is a diagram of a system for managing QoE in network systems according to an embodiment of the present disclosure.

Referring to FIG. 3, according to an embodiment of the present disclosure, a computer system 301 for implementing a method of managing QoE in network systems can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present invention.

The computer platform 301 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for managing QoE in network systems, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A network system comprising:
an access service network hosting a plurality of access service network gateways and a plurality of base stations, with each access service network gateway connected to a subset of base stations;
an orchestration device executing a life-cycle quality-of-experience model for video-on-demand flows, receiving content from at least one video-on-demand streaming server; and
a plurality of subscriber stations, receiving a plurality of video-on-demand flows, in communication with the orchestration device through at least one of the base stations, wherein the orchestration device:

tracks past variables associated with each of the subscriber stations, generates a predictive model for expected buffer levels at each of the subscriber stations based on the tracked past variables, determines an expected buffer level for each of the subscriber stations using the predictive model, assigns a quality-of-experience state to each of the subscriber stations based on the determined expected buffer level, and determines subscriber station assignments to at least one base station and an allocation of base station resources to the subscriber stations based on the assigned quality-of-experience states.

2. The network system of claim 1, wherein the past variables associated with each of the subscriber stations include a service level and a usage history.

3. The network system of claim 1, wherein the orchestration device is a component of a corresponding one of the access service network gateways.

4. The network system of claim 1, wherein the orchestration device is a distributed component of a subset of base stations connected to a corresponding one of the access service network gateways.

5. The network system of claim 1, wherein the orchestration device is a component of the access service network in signal communication between a corresponding one of the access service network gateways and the base stations connected to the corresponding gateway.

6. The network system of claim 1, wherein the life-cycle quality-of-experience model comprises parameters of the video-on-demand flows, wherein the parameters are updated based on the predicted future channel conditions and load.

7. A method for orchestrating a plurality of video-on-demand sessions being delivered to a plurality of subscriber stations, comprising:

determining estimates of future bit rates for all sessions being served to the subscriber stations and estimated loads at each of a plurality of base station serving the plurality of subscriber stations;

generating a predictive model for expected buffer levels at each of the subscriber stations based on the estimates of future bit rates;

determining an expected buffer level for each of the subscriber stations using the predictive model;

determining session states for each of the subscriber stations based on the determined expected buffer level in the absence of any intervention and a desired service level to take each session to a safe state;

adjusting parameters of the video-on-demand sessions within the plurality of base stations upon detecting an event;

determining a time at which global base station intervention is to be performed if local base station intervention is not possible; and determining subscriber station assignments to the plurality of base stations and allocations to each of the subscriber stations during each global intervention, wherein the method is executed by a processor.

8. The method of claim 7, wherein the method is executed according to a model comprising the parameters of the video-on-demand sessions, the method further comprising, updating the parameters based on predicted future channel conditions.

9. The method of claim 7, wherein the method is executed according to a model comprising the parameters of the video-on-demand sessions, the method further comprising, updating the parameters based on predicted future load on the plurality of base stations.

10. The method of claim 7, wherein the parameters comprise bit rates of the video-on-demand sessions.

11. The method of claim 7, further comprising scheduling of the video-on-demand sessions.

12. The method of claim 7, further comprising updating the time at which global intervention is to be performed.

13. A non-transitory computer readable medium embodying instructions executed by a processor to perform a method for orchestrating a plurality of video-on-demand sessions being delivered to a plurality of subscriber stations, the method comprising:

determining estimates of future bit rates for all sessions being served to the subscriber stations and estimated loads at each of a plurality of base stations serving the plurality of subscriber stations;

generating a predictive model for expected buffer levels at each of the subscriber stations based on the estimates of future bit rates;

determining an expected buffer level for each of the subscriber stations using the predictive model;

determining session states based on the determined expected buffer levels in the absence of any intervention and a desired service level to take each session to a safe state;

adjusting parameters of the video-on-demand sessions within the plurality of base stations upon detecting an event;

determining a time at which global base station intervention is to be performed if local base station intervention is not possible; and determining subscriber station assignments to the base station and allocations to each of the subscriber stations during each global intervention, wherein the method is executed by a processor.

14. The computer readable medium of claim 13, wherein the method is executed according to a model comprising the parameters of the video-on-demand sessions, the method further comprising, updating the parameters based on predicted future channel conditions.

15. The computer readable medium of claim 13, wherein the method is executed according to a model comprising the parameters of the video-on-demand sessions, the method further comprising, updating the parameters based on predicted future load on the plurality of base stations.

16. The computer readable medium of claim 13, wherein the parameters comprise bit rates of the video-on-demand sessions.

17. The computer readable medium of claim 13, further comprising scheduling of the video-on-demand sessions.

18. The computer readable medium of claim 13, further comprising updating the time at which global intervention is to be performed.

19. A network system comprising:

a connectivity services network providing content to a plurality of video-on-demand streaming servers;

an access service network hosting a plurality of access service network gateways and a plurality of base stations, with each access service network gateway connected to a subset of base stations;

an orchestration device executing a life-cycle quality-of-experience model for video-on-demand flows, receiving the content from at least one of the video-on-demand streaming servers; and a plurality of subscriber stations, receiving video-on-demand flows, in communication with the orchestration device through at least one of the base stations, wherein the orchestration device:

tracks past variables associated with each of the subscriber stations, generates a predictive model for expected buffer levels at each of the subscriber stations based on the tracked past variables, determines an expected buffer level for each of the subscriber stations using the predictive model, assigns a quality-of-experience state to each of the subscriber stations based on the determined expected buffer level, and determines subscriber station assignments to at least one base station and an allocation of base station resources to the subscriber stations based on the assigned quality-of-experience states.

20. The network system of claim 19, wherein the past variables associated with each of the subscriber stations include a service level and a usage history.

21. The network system of claim 19, wherein the orchestration device is a component of a corresponding one of the access service network gateways.

22. The network system of claim 19, wherein the orchestration device is a distributed component of a subset of base stations connected to a corresponding one of the access service network gateways.

23. The network system of claim 19, wherein the orchestration device is a component of the access service network in signal communication between a corresponding one of the access service network gateways and the base stations connected to the corresponding gateway.

24. The network system of claim 19, wherein the life-cycle quality-of-experience model comprises parameters of the video-on-demand flows, wherein the parameters are updated based on the predicted future channel conditions and load at the base stations.

25. The network system of claim 19, wherein the based stations implement the subscriber station assignments according to an assignment decision of the life-cycle quality-of-experience model.

* * * * *